(12) United States Patent  (10) Patent No.: US 8,902,501 B2
Suzuki et al.  (45) Date of Patent: Dec. 2, 2014

(54) STAGE SYSTEM AND MICROSCOPE

(75) Inventors: Fumiyasu Suzuki, Saitama (JP); Yu Hirono, Tokyo (JP); Yuichi Machida, Kanagawa (JP)

(73) Assignee: Sony Corporation, Tokyo (JP)

( * ) Notice: Subject to any disclaimer, the term of this patent is extended or adjusted under 35 U.S.C. 154(b) by 654 days.

(21) Appl. No.: 13/159,588

(22) Filed: Jun. 14, 2011

(65) Prior Publication Data

US 2012/0002276 A1 Jan. 5, 2012

(30) Foreign Application Priority Data

Jun. 30, 2010 (JP) ................................. 2010-150526

(51) Int. Cl.
G02B 21/26 (2006.01)
G02B 21/34 (2006.01)
G02B 21/24 (2006.01)

(52) U.S. Cl.
CPC ............... *G02B 21/34* (2013.01); *G02B 21/24* (2013.01); *G02B 21/26* (2013.01)
USPC ............................ 359/393; 359/368; 359/391

(58) Field of Classification Search
CPC ........ G02B 21/16; G02B 21/24; G02B 21/26; G02B 21/34; A61B 5/14503; A61B 5/14514; A61B 17/205
USPC ................................................. 359/391–398
See application file for complete search history.

(56) References Cited

U.S. PATENT DOCUMENTS

| 2,148,908 | A | * | 2/1939 | Lory | 359/393 |
| 5,659,421 | A | * | 8/1997 | Rahmel et al. | 359/391 |
| 7,642,097 | B2 | * | 1/2010 | Kronick et al. | 436/164 |
| 2009/0135477 | A1 | * | 5/2009 | Noda | 359/391 |

FOREIGN PATENT DOCUMENTS

| CN | 2741046 | 11/2005 |
| jp | 2008-262100 | 10/2008 |
| JP | 2009-63735 | 3/2009 |

OTHER PUBLICATIONS

The State Intellectual Property Office of The People's Republic of China, Notification of the First Office Action issued in connection with P.R.C. Application No. 2011101717323, dated Jul. 3, 2014. (16 pages).

* cited by examiner

*Primary Examiner* — Thong Nguyen
(74) *Attorney, Agent, or Firm* — K&L Gates LLP

(57) ABSTRACT

Disclosed herein is a stage system, including: a stage on which to mount a slide glass; a projection block projected more than the thickness of the slide glass to the side of that surface of the stage on which to dispose the slide glass; and a pressing block which is provided on that surface of the stage on which to dispose the slide glass, is thicker than the slide glass, and presses toward the projection block the slide glass disposed between itself and the projection block.

5 Claims, 14 Drawing Sheets

FIG.6A
FIG.6B
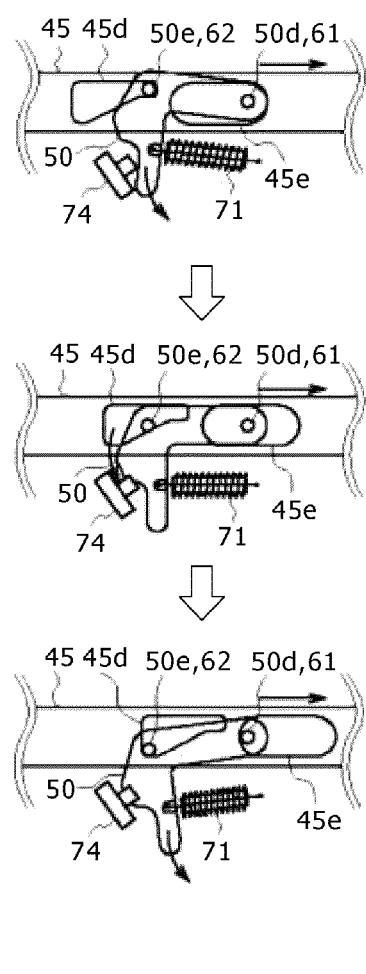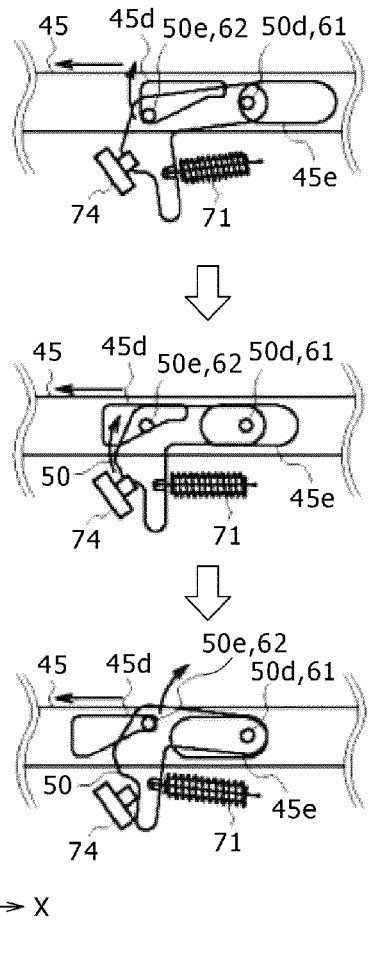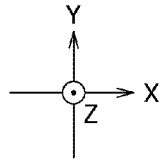

STAGE SYSTEM AND MICROSCOPE

CROSS REFERENCES TO RELATED APPLICATIONS

The present application claims priority to that disclosed in Japanese Priority Patent Application JP 2010-150526 filed in the Japan Patent Office on Jun. 30, 2010, the entire content of which is hereby incorporated by reference.

BACKGROUND

The present application relates to a stage system and a microscope, which are suitable for application, for example, to the field of observation of a biological sample (living body sample) through magnification.

Heretofore, a stage system has been proposed in which an L-shaped member for positioning a slide glass and a clip for pressing the slide glass against the L-shaped member are provided on a stage on which to mount the slide glass, and the slide glass is fixed at a predetermined position on the stage in such a manner as to be clamped between the L-shaped member and the clip (see, for example, Japanese Patent Laid-open No. 2009-63753 (paragraph 0023, FIG. 4) and Japanese Patent Laid-open No. 2008-262100 (FIG. 6)).

Meanwhile, in the above-mentioned stage system, the L-shaped member and the clip are configured to press a side surface or a corner of the slide glass having a certain thickness; accordingly, the thickness of the clip is set to be roughly equal to or slightly smaller than the thickness of the slide glass.

Therefore, as shown in FIG. 1A, in the stage system 115, the slide glass SG mounted on the stage 141 is fixed by pressing the clip 150 against a side surface or a corner of the slide glass SG.

Meanwhile, in practice, a sample immobilized by a sealing medium MD is fixed in such a manner as to be sandwiched between the slide glass SG and a cover glass CG. In this instance, as shown in FIG. 1B, the cover glass CG and the sealing medium MD may in some cases be fixed in the state of protruding from the slide glass SG.

In such a case, in the stage system 115, as shown in FIG. 1C, an attempt to fix the slide glass SG by the clip 150 may cause the clip 150 to make contact with the sealing medium MD, which is protruding on the side surface of the slide glass SG, and to lift up the slide glass CG. As a result, it may be extremely difficult to fix the slide glass SG at a predetermined position.

Thus, it is desirable to provide a stage system and a microscope such that the accuracy in fixation of a slide glass can be enhanced.

SUMMARY

According to an embodiment, there is provided a stage system including: a stage on which to mount a slide glass; a projection block projected more than the thickness of the slide glass to the side of that surface of the stage on which to dispose the slide glass; and a pressing block which is provided on that surface of the stage on which to dispose the slide glass, is thicker than the slide glass, and presses toward the projection block the slide glass disposed between itself and the projection block.

In addition, according to another embodiment, there is provided a microscope including: a stage on which to mount a slide glass; a projection block projected more than the thickness of the slide glass to the side of that surface of the stage on which to dispose the slide glass; a pressing block which is provided on that surface of the stage on which to dispose the slide glass, is thicker than the slide glass, and presses toward the projection block the slide glass disposed between itself and the projection block; and a lens magnifying a sample disposed on the slide glass mounted on the stage.

This ensures that, even in the case where the sealing medium and the cover glass are protruding from the slide glass, it is possible, since the projection block and the pressing block are thicker than the slide glass, to reduce the risk of a situation in which the projection block or the pressing block might ride onto the slide glass, making it very difficult to fix the slide glass at a predetermined fixing position.

According to the embodiments of the present application, even in the case where the sealing medium and the cover glass are protruding from the slide glass, it is possible, since the projection block and the pressing block are thicker than the slide glass, to reduce the risk of a situation in which the projection block or the pressing block might ride onto the slide glass, making it very difficult to fix the slide glass at a predetermined fixing position. Thus, a stage system and a microscope are realized such that the accuracy in fixation of a slide glass can be enhanced.

Additional features and advantages are described herein, and will be apparent from the following Detailed Description and the figures.

BRIEF DESCRIPTION OF THE FIGURES

FIGS. 6A and 6B show schematic diagrams illustrating the manner in which an L-shaped clip is moved;

DETAILED DESCRIPTION

Embodiments of the present application will be described below in detail with reference to the drawings.

1. First Embodiment
2. Another Embodiment

1. First Embodiment 1-1. Configuration of Microscope System

Figure 1A:
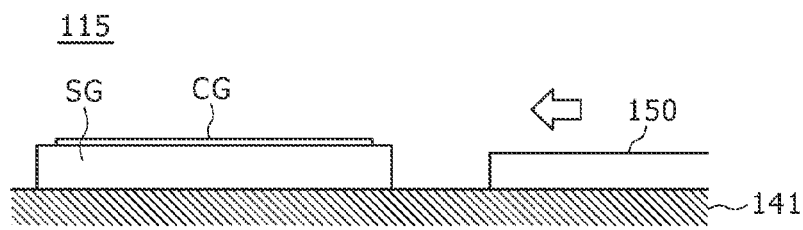
FIGS. 1A to 1C are schematic diagrams showing the manner in which a slide glass is fixed by a stage system according to related art.
Figure 1B:
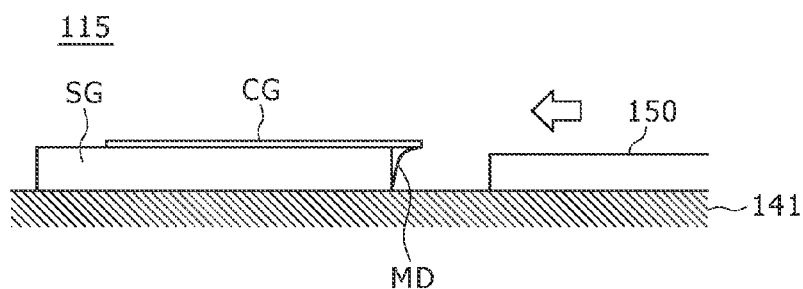
Figure 1C:
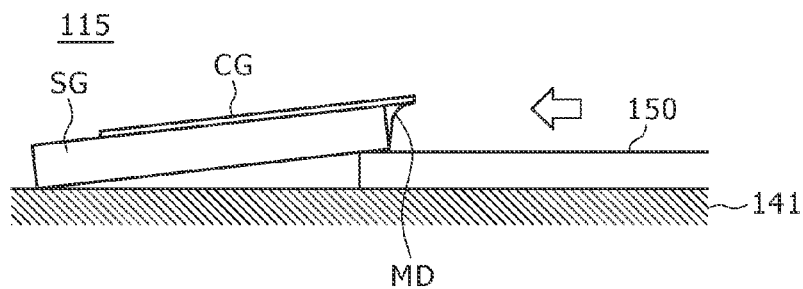
Figure 2:
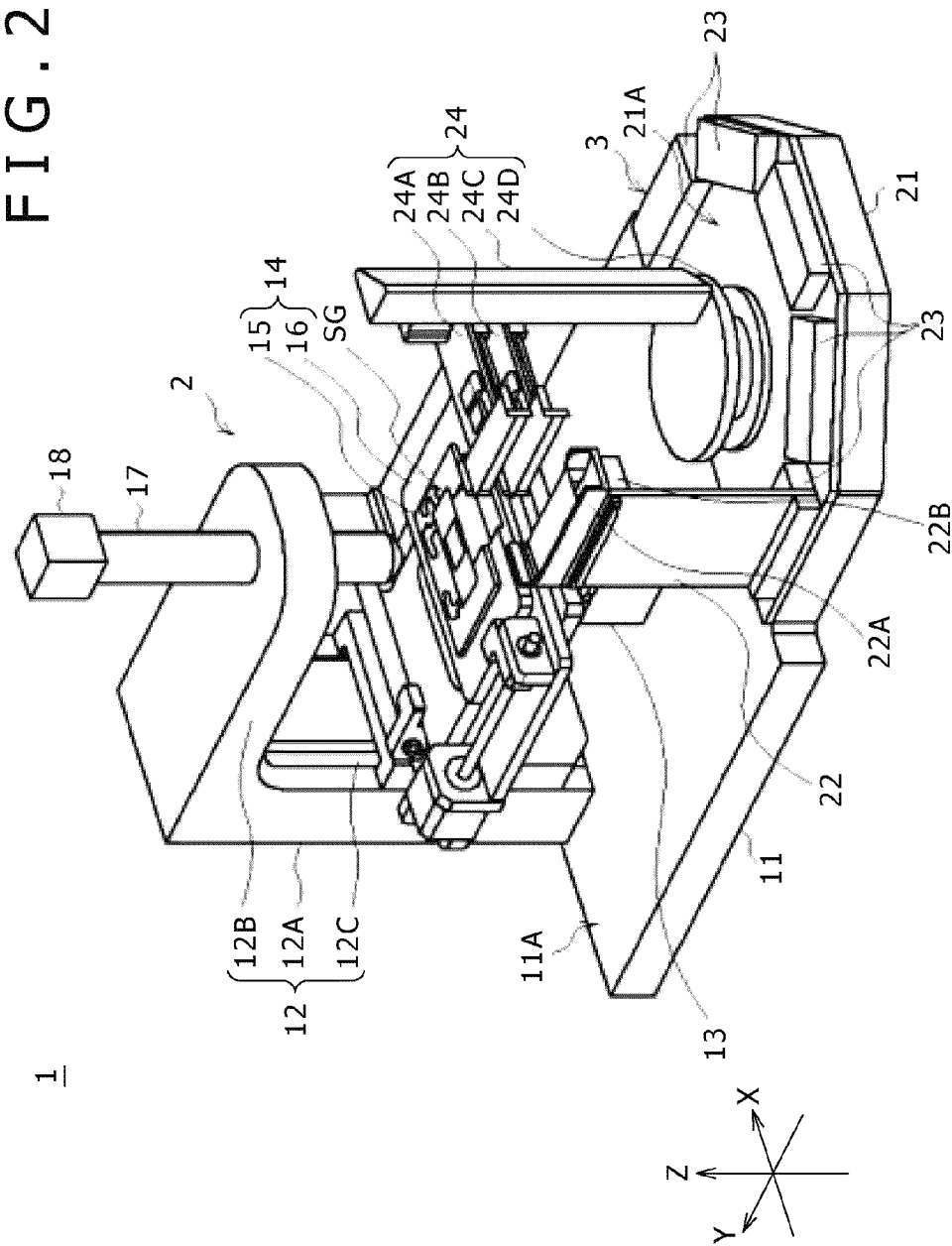
FIG. 2 is a schematic diagram showing the configuration of a microscope system.

FIG. 2 illustrates a microscope system 1 according to an embodiment. The microscope system 1 includes a data processing unit 4 (FIG. 10) having a personal computer or the like, in addition to a microscope 2 and a loading device 3.

The microscope 2 magnifies in a predetermined scale factor a biological sample disposed on a slide glass SG, and photographs the biological sample. The loading device 3 mounts (loads) the slide glass SG onto a stage of the microscope 2, and discharges (unloads) the slide glass SG from the stage. The data processing unit 4 controls the components of the microscope 2 and the loading device 3, and acquires the image picked up by the microscope 2.

On the slide glass SG is arranged the biological sample, which has smear cells or a tissue section of a connective tissue (e.g., blood) or an epithelial tissue or both of them. The biological sample is immobilized on the slide glass SG by a sealing medium MD, in the state of being covered with a cover glass CG. Incidentally, the biological sample may be subjected not only to general staining represented by HE (hematoxylin-eosin) staining, Giemsa staining, Papanicolaou staining, etc. but also to fluorescent staining such as FISH (Fluorescence In-Situ Hybridization), enzyme-antibody method, etc., as required.

In the microscope 2, a frame section 12 and a transmitting illumination section 13 are provided at predetermined position on an upper surface 11A of a base section 11. The frame section 12 has a support section 12B extending in a direction (Y-axis negative direction) horizontal to the base section 11 from one end on the upper side of a prop section 12A extending in a direction (Z-axis positive direction) orthogonal to the upper surface 11A of the base section 11, and is L-shaped in general form.

The prop section 12A is formed with a guide 12C extending in the Z-axis direction, and a stage unit 14 is provided which is movable in the Z-axis direction while being engaged with the guide 12C. The stage unit 14 includes a stage system 15 on which to mount the slide glass SG, and a stage driving mechanism 16 which moves the stage system 15 in the X-axis and Y-axis directions and which moves the stage system 15 in the Z-axis direction together with itself along the guide 12C.

The support section 12B is provided, at a position on a vertical line of the transmitting illumination section 13, with a lens system 17 having an optical axis coincident with the vertical line. An image sensing element 18 is provided on the optical axis of the lens system 17 and on the upper side (the Z-axis positive direction side) of the lens system 17.

The lens system 17 has a plurality of lenses including an objective lens and an image forming lens, and magnifies in a predetermined scale factor the image of the biological sample arranged on the slide glass SG mounted on the stage system 15 and illuminated by the transmitting illumination section 13. The image sensing element 18 is so configured that the image magnified by the lens system 17 is formed on an image sensing plane, whereby the image can be picked up.

On the other hand, the loading device 3 is provided with a base section 21 coupled to the base section 11 of the microscope 2. On an upper surface 21A of the base section 21, five tray arrangement bases 23 on each of which a tray 22 storing the slide glass SG therein or a slide glass cassette (not shown) capable of storing a plurality of the slide glasses SG therein can be arranged are provided, on the circumference of a circle having a center at a predetermined reference position.

The trays 22 include supply trays 22A in each of which the slide glass SG serving as an object of photography is set, and discharge trays 22B into each of which the slide glass SG having been subjected to photography is recovered from the stage system 15 for the purpose of discharge; in this case, the supply tray 22A and the discharge tray 22B are provided respectively on the upper and lower sides, with a predetermined spacing therebetween.

In addition, at the reference position on the base section 21 is provided a loading mechanism 24 by which the slide glass SG set in the supply tray 22A is mounted (loaded) onto the stage system 15 and by which the slide glass SG having been subjected to photography is returned (unloaded) from the stage system 15 into the discharge tray 22B.

The loading mechanism 24 includes a supply arm 24A, a discharge arm 24B, a vertically movable section 24C and a turning section 24D. In the loading mechanism 24, the turning section 24D turnable with the reference position on the base section 21 as a center of rotation is provided, and the vertically movable section 24C for moving the supply arm 24A and the discharge arm 24B in the vertical direction (Z-axis direction) is provided on the turning section 24D.

Figure 3:
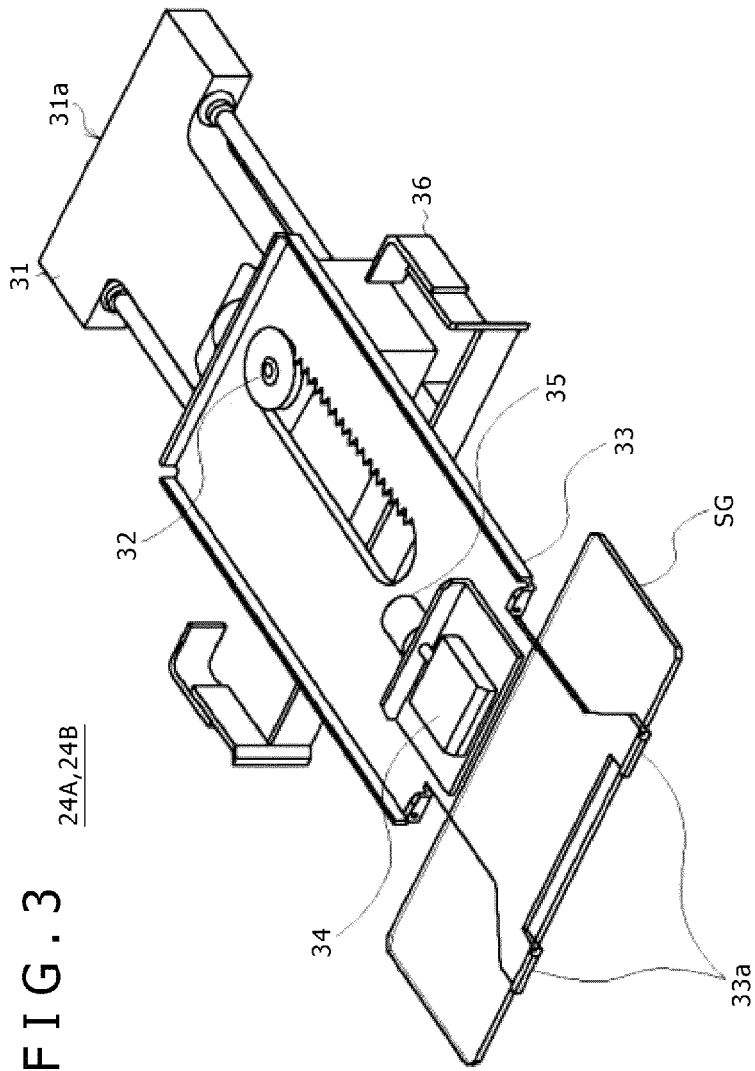
FIG. 3 is a schematic diagram showing the configuration of a supply arm and a discharge arm.

Each of the supply arm 24A and the discharge arm 24B is configured as shown in FIG. 3, wherein a vertically movable section fixing surface 31a, which is a side surface of an arm base section 31 having a flat roughly rectangular parallelopiped shape, is connected to the vertically movable section 24C. This configuration permits the supply arm 24A and the discharge arm 24B to be moved in the vertical direction (Z-axis direction) by the vertically movable section 24C.

The arm base section 31 is provided with a driving section 32 operating according to control of the data processing unit 4. A plate-like arm translation section 33 is provided which can be moved in the direction orthogonal to the vertically movable section fixing surface 31a according to the operation of the driving section 32.

The arm translation section 33 has a slide glass holding section 33A formed by bending upward (in the Z-axis positive direction) a tip portion thereof on the side opposite to the side of the vertically movable section fixing surface 31a, in such a manner that the slide glass SG can be held by the slide glass holding section 33A.

Besides, on the arm translation section 33, an arm clamp 34 is provided at a position spaced from the slide glass holding section 33A by a distance greater than the length of the shorter (minor) edge of the slide glass SG. The arm clamp 34 can be moved in the direction orthogonal to the vertically movable section fixing surface 31a, according to the operation of a clamp motor 35 which operates according to the control of the data processing unit 4.

In addition, the arm base section 31 is provided with a fall-off preventive guide 36 having guides spaced apart slightly more than the length of the longer (major) edge of the slide glass SG, on the side of a surface opposite to the vertically movable section fixing surface 31a.

Configured as above, the supply arm 24A grips the slide glass SG (which is set in the supply tray 22A) by clamping it between the slide glass holding section 33A and the arm clamp 34, and mounts the slide glass SG onto the stage system 15.

The discharge arm 24B grips the slide glass SG (which is mounted on the stage system 15) by clamping it between the slide glass holding section 33A and the arm clamp 34, and discharges the slide glass SG into the discharge tray 22B.

1-2. Configuration of Stage System

Figure 4:
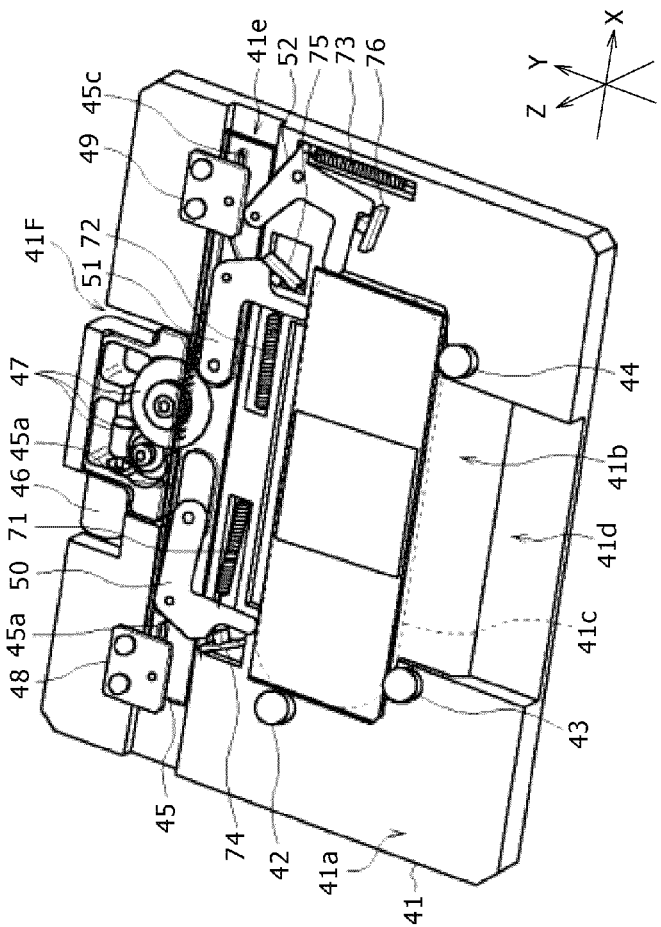
FIG. 4 is a schematic diagram showing configuration (1) of a stage system.
Figure 5:
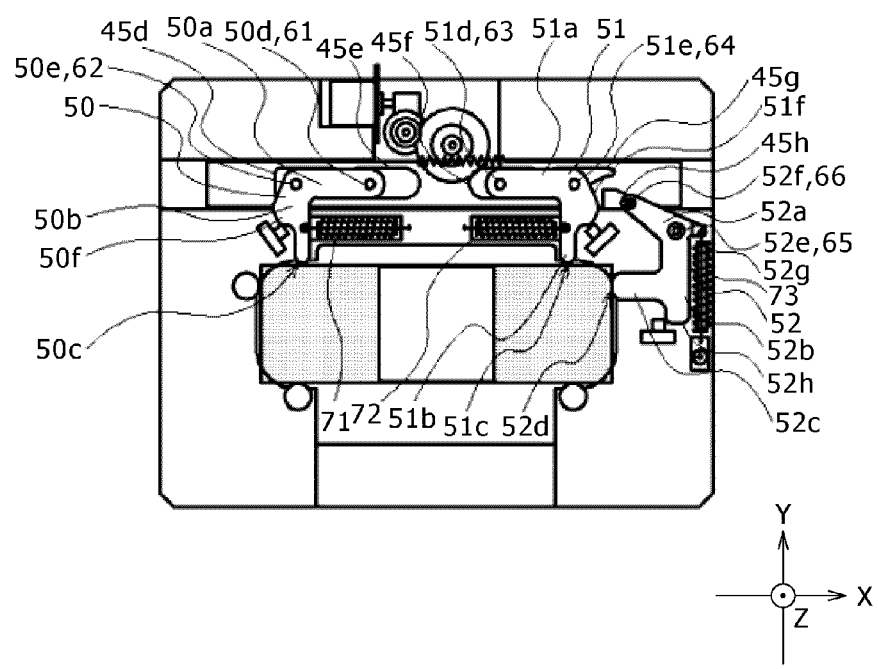
FIG. 5 is a schematic diagram showing configuration (2) of the stage system.

Meanwhile, the stage system 15 in the microscope 2 is so designed that the slide glass SG can be fixed at a predetermined position. Specifically, the stage system 15 has a configuration in which, as shown in FIGS. 4 and 5, a stage 41 having a roughly rectangular parallelopiped shape being flat along an X-Y plane is supported by the stage driving mechanism 16.

The stage 41 is provided with an opening 41*b* which penetrates the stage 41 in the Z-axis direction. The opening 41*b* includes a hole (hereinafter referred to also as slide glass hole) 41*c* (the part indicated by broken line in FIG. 4) which is so sized that only the four corners of the slide glass SG are partly caught on the stage 41 when the slide glass SG is mounted on the stage 41. In addition, the opening 41*b* includes a hole for securing a space which serves as a passage when the supply arm 24A mounts the slide glass SG onto the stage 41.

The stage 41 is provided, in the center on the loading mechanism 24 side, with an arm passage groove 41*d* which has a width slightly greater than the lateral width of the supply arm 24A and the discharge arm 24B and has a predetermined thickness in the Z-axis direction. The arm passage groove 41*d* is provided for securing a space which serves as a passage when the supply arm 24A mounts the slide glass SG onto the stage 41 and when the discharge arm 24B discharges the slide glass SG.

A projection 42 having a roughly solid cylindrical shape taller than the thickness of the slide glass SG is projected from an upper surface 41*a* of the stage 41, in the manner of partly protruding to the slide glass hole 41*c* side from a shorter (minor) edge on the X-axis negative direction side of the slide glass hole 41*c*.

In addition, projections 43 and 44 having a roughly solid cylindrical shape taller than the thickness of the slide glass SG are projected from the upper surface 41*a* of the stage 41, at the left and right of the arm passage groove 41*d* near the longer (major) edge on the Y-axis negative direction side of the slide glass hole 41*c*, in the manner of partly protruding to the slide glass hole 41*c* side.

These projections 42, 43 and 44 serve as references for a fixing position in fixation of the slide glass SG onto the stage 41.

The stage 41 is provided, at a predetermined position on the Y-axis positive direction side relative to the opening 41*b*, with a groove (hereinafter referred to also as cam groove) which has a predetermined width and a predetermined thickness. In the cam groove 41*e* is provided a flat plate-like cam plate 45 which is substantially equal to the cam groove 41*e* in width and thickness and is shorter than the length in the X-axis direction of the stage 41.

Besides, the stage 41 is formed with a motor-and-gear arrangement groove 41*f*, in such a manner that a part of a side surface on the Y-axis positive direction side of the stage 41 is recessed. A motor 46 and a gear group 47 are arranged in the motor-and-gear arrangement groove 41*f*.

The motor 46 is rotationally driven by the control of the data processing unit 4. The gear group 47, by receiving a rotating motion of the motor 46 and being engaged with a screw groove 45*a* provided in a side surface of the cam plate 45, reciprocates the cam plate 45 in the X-axis direction within the cam groove 41*f*. In other words, the motor or driving block 46 reciprocates the cam plate or reciprocation block 45 in the X-axis direction through the gear group 47.

The cam plate 45 is provided, on both the left and right sides, with through-holes 45*b* and 45*c* which are elongated in the X-axis direction. In these through-holes 45*b* and 45*c* are inserted pins which are provided extending to the stage 41 from disengagement preventive plates 48 and 49 that are each provided at a predetermined position of the stage 41 so as to cover a part of the cam plate 45 from the Z-axis positive direction side. Therefore, the disengagement preventive plates 48 and 49 can prevent the cam plate 45 from being disengaged from the cam groove 41*e*.

In addition, the cam plate 45 is provided with an inclined hole 45*d*, a support shaft hole 45*e*, a support shaft hole 45*f*, an inclined hole 45*g* and an inclined groove 45*h*, in this order along the X-axis positive direction. The inclined holes 45*d* and 45*g* are each formed in a roughly triangular shape wherein a surface on the Y-axis negative direction side is inclined whereas a surface on the Y-axis positive direction side is parallel to the X-axis, in such a manner that the hole size is narrowed along the X-axis positive direction.

The support shaft holes 45*e* and 45*f* are each formed in a racetrack-like shape elongated along the X-axis. The inclined groove 45*h* is formed in a roughly triangular shape wherein a side surface on the Y-axis negative direction side of the cam plate 45 is inclined toward the Y-axis negative direction side along the X-axis positive direction.

On the cam plate 45, there are provided L-shaped clips 50 and 51 which are thicker than the slide glass SG and roughly L-shaped, and a U-shaped clip 52 which is thicker than the slide glass SG and roughly U-shaped.

The L-shaped clip 50 is formed in a roughly L shape wherein a plate-like section 50*a* substantially parallel to the X-axis and a plate-like section 50*b* substantially parallel to the Y-axis are formed at right angles to each other. The plate-like sections 50*a* and 50*b* of the L-shaped clip 50 are set to have such lengths that a tip 50*c* is located on the Y-axis positive direction side (outer side) relative to the longer edge on the Y-axis positive direction side of the slide glass hole 41*c* in the "open state" described later and that the tip 50*c* is located on the Y-axis negative direction side (inner side) relative to the longer edge in the "closed state" described later. In addition, the tip 50*c* is so inclined as to be elongated toward the Z-axis positive direction side.

The L-shaped clip 50 has a support shaft hole 50*d* provided at a position near one end of the plate-like section 50*a*, and the support shaft hole 50*d* is engaged with a support shaft 61 which is projected from the stage 41 and inserted through the support shaft hole 45*e* in the cam plate 45, in such a manner that the L-shaped clip 50 can be turned with the center of the support shaft 61 as a center of rotation.

Besides, the L-shaped clip 50 is provided with a cam follower hole 50*e* between the plate-like section 50*a* and the plate-like section 50*b*, and a cam follower 62 abutted on the inclined surface of the inclined hole 45*d* in the cam plate 45 is engaged with the cam follower hole 50*e*.

In addition, the L-shaped clip 50 is formed with a projected part 50*f* such that the side surface on the X-axis negative direction side of the plate-like section 50*b* is formed in a projected shape. Besides, a spring 71 fixed at its one end to the stage 41 is attached at its other end to the plate-like section 50*b* of the L-shaped clip 50, on the opposite side to the projected part 50*f*, in such a manner that the plate-like section 50*b* is constantly pulled roughly in the X-axis positive direction by a biasing force acting in the contraction direction of the spring 71 (roughly in the X-axis positive direction).

The biasing force of the spring 71 is set to be a force of such a degree that the cover glass CG is not broken even when the cover glass CG is pressed by the tip 50*c* of the L-shaped clip 50.

The L-shaped clip 51 is formed in a roughly L shape wherein a plate-like section 51*a* substantially parallel to the X-axis and a plate-like section 51*b* substantially parallel to the Y-axis are formed at right angles to each other. The plate-like section 51*a* and 51*b* of the L-shaped clip 51 are set to have such lengths that a tip 51*c* is located on the outer side relative to the longer edge on the Y-axis positive direction side of the slide glass hole 41c in the open state described later and that the tip 51c is located on the inner side relative to the longer edge in the closed state described later. In addition, the tip 51c is so inclined as to be elongated toward the Z-axis positive direction side.

The L-shaped clip 51 has a support shaft hole 51d provided at a position near one end of the plate-like section 51a, and the support shaft hole 51d is engaged with a support shaft 63 which is projected from the stage 41 and inserted through the support shaft hole 45f in the cam plate 45, in such a manner that the L-shaped clip 51 can be turned with the center of the support shaft 63 as a center of rotation.

Besides, the L-shaped clip 51 is provided with a cam follower hole 51e between the plate-like section 51a and the plate-like section 52b, and a cam follower 64 abutted on the inclined surface of the inclined hole 45g in the cam plate 45 is engaged with the cam follower hole 51e.

In addition, the L-shaped clip 51 is formed with a projected part 51f such that the side surface on the X-axis positive direction side of the plate-like section 51b is formed in a projected shape. Besides, a spring 72 fixed at its one end to the stage 41 is attached at its other end to the plate-like section 51b of the L-shaped clip 51, on the opposite side to the projected part 51f, in such a manner that the plate-like section 51b is constantly pulled roughly in the X-axis negative direction by a biasing force acting in the contraction direction of the spring 72 (roughly in the X-axis negative direction).

The biasing force of the spring 72 is set to be a force of such a degree that the cover glass CG is not broken even when the cover glass CG is pressed by the tip 51c of the L-shaped clip 51.

The U-shaped clip 52 includes a plate-like section 52a having one end located on the upper side of the inclined groove 45h of the cam plate 45, a plate-like section 52b substantially parallel to the Y-axis, and a plate-like section 52c substantially parallel to the X-axis, wherein the plate-like sections 52a, 52b and 52c together form a roughly U shape.

The plate-like sections 52a, 52b and 52c of the U-shaped clip 52 are set to have such lengths that a tip 52d is located on the X-axis positive direction side (outer side) relative to the shorter (minor) edge on the X-axis positive direction side of the slide glass hole 41c in the open state described later and that the tip 52d is located on the X-axis negative direction side (inner side) relative to the shorter edge in the closed state described later. In addition, the tip 52d is so inclined as to be elongated toward the Z-axis positive direction side.

The U-shaped clip 52 has a support shaft hole 52e provided between the plate-like sections 52a and 52b, and the support shaft hole 52e is engaged with a support shaft 65 which is projected from a predetermined position of the stage 41, in such a manner that the U-shaped clip 52 can be turned with the center of the support shaft 65 as a center of rotation.

The U-shaped clip 52 is provided with a cam follower hole 52f at one end, on the opposite side to the support shaft hole 52e, of the plate-like section 52a, and a cam follower 66 abutted on the inclined surface of the inclined groove 45h in the cam plate 45 is engaged with the cam follower hole 52f.

In addition, the U-shaped clip 52 is formed with a projected part 52g such that a side surface on the X-axis positive direction side of the support shaft hole 52e is projected. A spring 73 fixed at its one end to the stage 41 is attached at its other end to the projected part 52g, and the projected part 52g is constantly pulled roughly in the Y-axis negative direction by a biasing force acting in the contraction direction of the spring 73 (in a roughly Y-axis negative direction).

The biasing force of the spring 73 is set to be a force of such a degree that the cover glass CG is not broken even when the cover glass CG is pressed by the tip 52d of the U-shaped clip 52.

The U-shaped clip 52 is formed, between the plate-like sections 52b and 52c, with a projected part 52h projected on the Y-axis negative direction side.

Meanwhile, as shown in FIG. 6A, when the cam plate 45 is moved in the X-axis positive direction, the cam follower 62 in engagement with the cam follower hole 50e in the L-shaped clip 50 is moved in the Y-axis negative direction along the inclined surface of the inclined hole 45d, so that the L-shaped clip 50 is moved counterclockwise, with the center of the support shaft 61 as a center of rotation.

In addition, when the cam plate 45 is moved in the X-axis positive direction, the cam follower 64 in engagement with the cam follower hole 51e in the L-shaped clip 51 is moved in the Y-axis negative direction along the inclined surface of the inclined hole 45f, so that the L-shaped clip 51 is moved clockwise, with the center of the support shaft 63 as a center of rotation.

Further, when the cam plate 45 is moved in the X-axis positive direction, the cam follower 66 in engagement with the one end side of the plate-like section 52a of the U-shaped clip 52 is moved in the Y-axis positive direction along the inclination of the inclined groove 45h, so that the U-shaped clip 52 is moved clockwise, with the center of the support shaft 65 as a center of rotation.

On the other hand, as shown in FIG. 6B, when the cam plate 45 is moved in the X-axis negative direction, the cam follower 62 in engagement with the cam follower hole 50e in the L-shaped clip 50 is moved in the Y-axis positive direction along the inclination of the inclined hole 45d, so that the L-shaped clip 50 is moved clockwise, with the center of the support shaft 61 as a center of rotation.

Besides, when the cam plate 45 is moved in the X-axis negative direction, the cam follower 64 in engagement with the cam follower hole 51e in the L-shaped clip 51 is moved in the Y-axis positive direction along the inclination of the inclined hole 45g, so that the L-shaped clip 51 is moved counterclockwise, with the center of the support shaft 63 as a center of rotation.

Further, when the cam plate 45 is moved in the X-axis negative direction, the cam follower 66 in engagement with the one end side of the plate-like section 52a of the U-shaped clip 52 is moved in the Y-axis negative direction along the inclination of the inclined groove 45h, so that the U-shaped clip 52 is moved counterclockwise, with the center of the support shaft 65 as a center of rotation.

Thus, in the stage system 15, when the cam plate 45 is moved in the X-axis positive direction, the tips 50c and 51c of the L-shaped clips 50 and 51 are moved in the Y-axis negative direction, and the tip 52d of the U-shaped clip 52 is moved in the X-axis negative direction. In addition, in the stage system 15, when the cam plate 45 is moved in the X-axis negative direction, the tips 50c and 51c of the L-shaped clips 50 and 51 are moved in the Y-axis positive direction, and the tip 52d of the U-shaped clip 52 is moved in the X-axis positive direction.

Figure 7A:
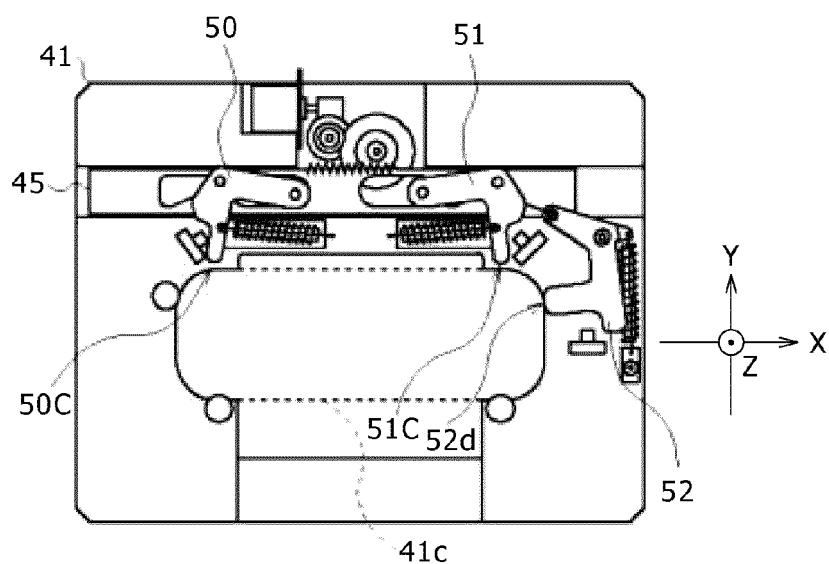
FIGS. 7A and 7B are schematic diagrams showing an open state and a closed state.

Besides, in the stage system 15, when the cam plate 45 is located most on the X-axis negative direction side in the movable range thereof, as shown in FIG. 7A, a state is established wherein the tips 50c and 51c of the L-shaped clips 50 and 51 are located most on the Y-axis positive direction side, and the tip 52d of the U-shaped clip 52 is located most on the X-axis positive direction side (hereinafter, this state will be referred to also as "open state"). In this open state, the tips 50c, 51c and 52d of the L-shaped clips 50 and 51 and the U-shaped clip 52 are all located outside the slide glass hole 41c.

Figure 7B:
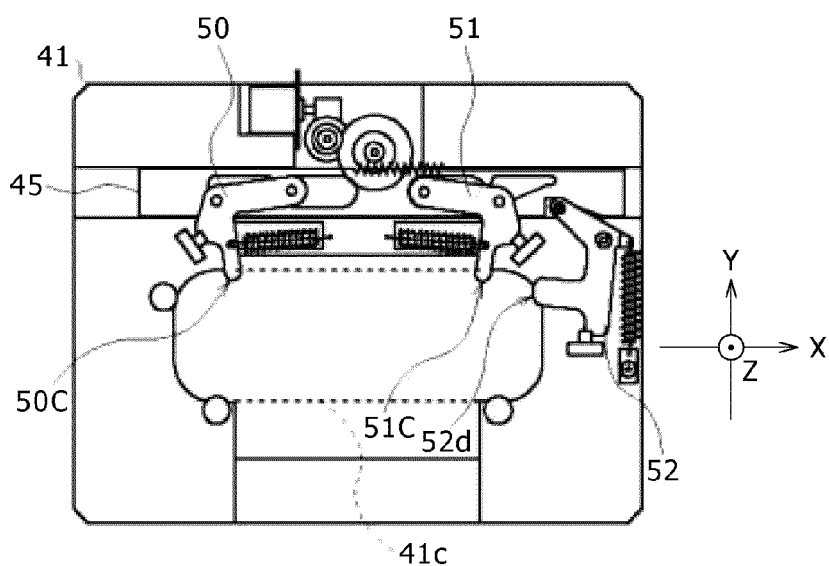

In addition, in the stage system 15, when the cam plate 45 is located most on the X-axis positive direction side in the movable range thereof, as shown in FIG. 7B, a state is established wherein the tips 50c and 51c of the L-shaped clips 50 and 51 are located most on the Y-axis negative direction side, and the tip 52d of the U-shaped clip 52 is located most on the X-axis negative direction side (hereinafter, this state will be referred to also as "closed state"). In this closed state, the tips 50c, 51c and 52d of the L-shaped clips 50 and 51 and the U-shaped clip 52 are all located inside the slide glass hole 41c.

Now, the case of fixing the slide glass SG onto the stage 41 will be described below. When the stage system 15 is in the open state, the slide glass SG is mounted on the stage 41 at a position (in an area) surrounded by the projections 42, 43, 44, the tip 50c of the L-shaped clip 50, the tip 51c of the L-shaped clip 51 and the tip 52d of the U-shaped clip 52 (hereinafter, this position will be referred to also as "slide glass mounting position").

Then, in the stage system 15, the motor 46 is driven so as to move the cam plate 45 toward the X-axis negative direction side, whereby the tips 50c and 51c of the L-shaped clips 50 and 51 are moved in the Y-axis negative direction, and the tip 52d of the U-shaped clip 52 is moved in the X-axis negative direction.

In this instance, in the stage system 15, the tip 50c of the L-shaped clip 50 and the tip 51c of the L-shaped clip 51 as well as the tip 52d of the U-shaped clip 52 make contact with the slide glass SG, and press the slide glass SG against the projections 42, 43 and 44.

Then, in the stage system 15, as has been shown in FIG. 4, the slide glass SG is fixed at the fixing position by the projections 42, 43, 44, the tip 50c of the L-shaped clip 50, the tip 51c of the L-shaped clip 51 and the tip 52d of the U-shaped clip 52.

In this instance, the L-shaped clips 50 and 51 and the U-shaped clip 52, being biased by the biasing forces of the springs 71, 72 and 73, respectively, each press the slide glass SG with a force of such a degree that the cover glass CG is not broken.

Incidentally, in the stage system 15, even if the cam plate 45 is moved toward the X-axis negative direction side relative to its position at the time of fixing the slide glass SG, the L-shaped clips 50 and 51 and the U-shaped clip 52 are stopped at their positions at the time of fixation of the slide glass SG.

Therefore, when the cam plate 45 is moved toward the X-axis negative direction side relative to its position at the time of fixing the slide glass SG, the cam followers 62, 64 and 66 of the L-shaped clips 50 and 51 and the U-shaped clip 52 are separated from the inclined surfaces of the inclined holes 45d and 45g and the inclined groove 45h, respectively.

Meanwhile, the stage 41 is provided with photointerrupters 74, 75 and 76 (see FIG. 4) each of which includes a light-emitting section and a light-receiving section at opposite positions, wherein whether or not a thing is present between the light-emitting section and the light-receiving section is decided through a process in which detection light emitted from the light-emitting section is received by the light-receiving section.

The photointerrupter 74 is arranged at such a position that the projected part 50f of the L-shaped clip 50 is located between the light-emitting section and the light-receiving section to thereby interrupt the detection light only when the closed state is established. The photointerrupter 75 is arranged at such a position that the projected part 51f of the L-shaped clip 51 is located between the light-emitting section and the light-receiving section to thereby interrupt the detection light only when the closed state is established. The photointerrupter 76 is arranged at such a position that the projected part 52h of the U-shaped clip 52 is located between the light-emitting section and the light-receiving section to thereby interrupt the detection light only when the closed state is established.

Each of the photointerrupters 74, 75 and 76 outputs a detection signal when the detection light is interrupted. Therefore, the photointerrupters 74, 75 and 76 output the detection signal only when the L-shaped clips 50 and 51 and the U-shaped clip 52 are moved to their positions corresponding to the closed state, and do not output the detection signal when the slide glass SG is fixed in the fixing position.

Figure 8:
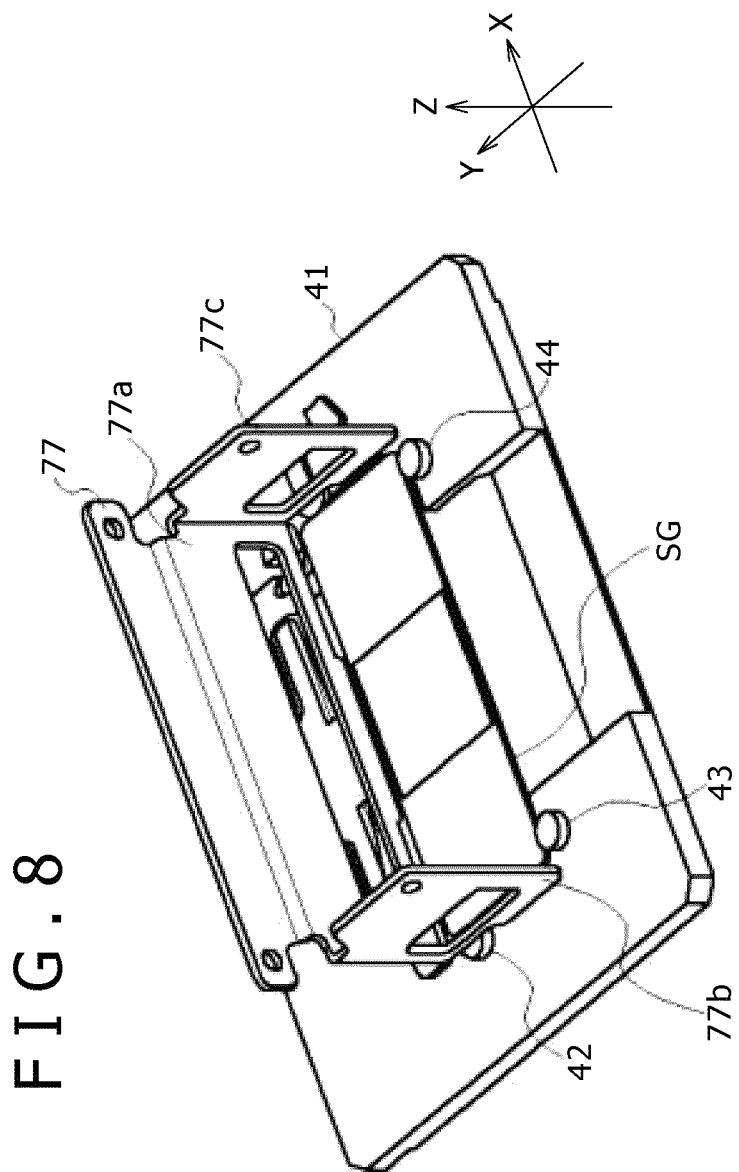
FIG. 8 is a schematic diagram showing configuration (1) of a movement preventive guide.
Figure 9:
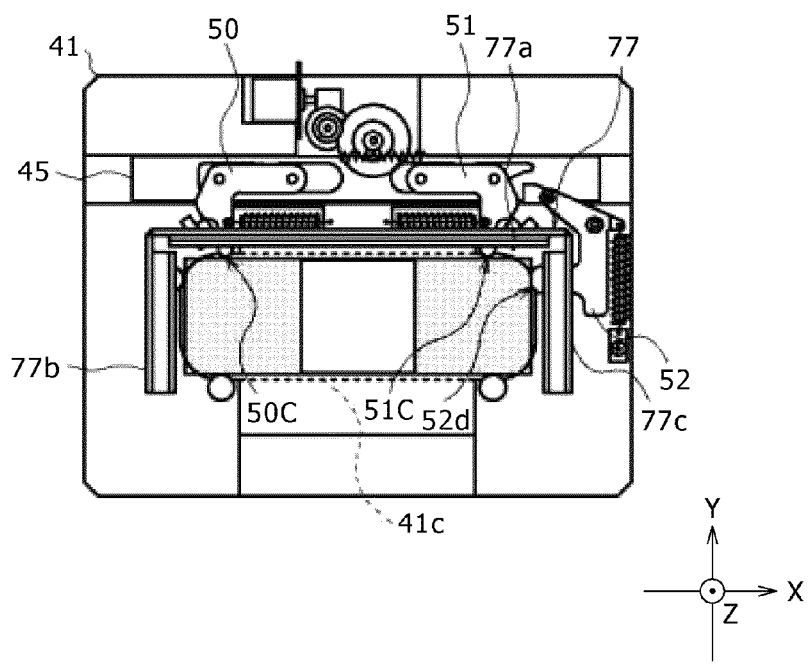
FIG. 9 is a schematic diagram showing configuration (2) of the movement preventive guide.

Besides, in the stage system 15, as shown in FIGS. 8 and 9, a movement preventive guide 77 is provided at a position spaced in the Z-axis positive direction from the upper surface 41a of the stage 41. Incidentally, in FIGS. 8 and 9, other components or sections than those necessary for description of the movement preventive guide 77 are omitted, for convenience of description.

The movement preventive guide 77 has a roughly angular U-shaped structure which includes a central plate 77a substantially parallel to the X-Z plane and side plates 77b and 77c substantially parallel to the Y-Z plane and connected respectively to both side edges (the edges at both ends in the X-axis direction) of the central plate 77a, and which is open on the loading device 3 side.

The central plate 77a is longer than the longer (major) edge of the slide glass SG in the X-axis direction. The side plates 77b and 77c are longer than the shorter (minor) edge of the slide glass SG in the Y-axis direction.

The movement preventive guide 77 is arranged to be spaced in the Z-axis positive direction from the upper surface 41a of the stage 41 by a distance which is longer than the thickness of the slide glass SG and which is shorter than the sum of the thickness of the slide glass SG and the thickness of the L-shaped clips 50, 51 and the U-shaped clip 52.

In addition, the movement preventive guide 77 is so arranged that it does not overlap with the slide glass hole 41c in the stage 41, while located on the upper side of the slide glass hole 41c, and that the area of the slide glass hole 41c is surrounded by the central plate 77a and the side plates 77b and 77c.

1-3. Configuration of Data Processing Unit

Figure 10:
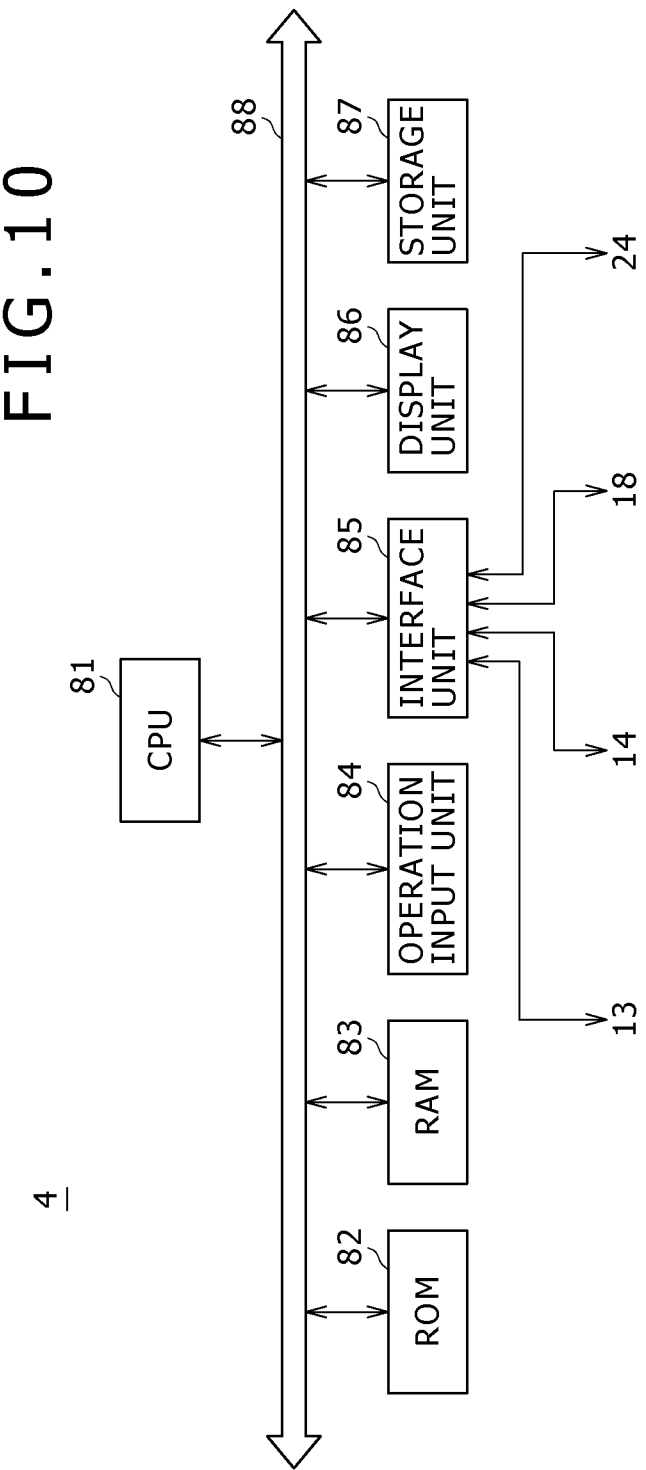
FIG. 10 is a schematic diagram showing the configuration of a data processing unit.

Now, the configuration of the data processing unit 4 will be described below. As shown in FIG. 10, this data processing unit 4 is configured by connecting various pieces of hardware to a CPU (Central Processing Unit) 81 in charge of control.

Specifically, a ROM (Read Only Memory) 82, a RAM (Random Access Memory) 83 serving as a work memory for the CPU 81, an operation input unit 84 for inputting instructions according to the user's operations, an interface unit 85, a display unit 86 and a storage unit 87 are connected to the CPU 81 through a buss 88.

Programs for executing various processings are stored in the ROM 82. To the interface unit 85 are connected the transmitting illumination section 13, the stage unit 14, the image sensing element 18 and the loading mechanism 24 (FIG. 2).

To the display unit 86, there is applied a liquid crystal display, an EL (Electro Luminescence) display, a plasma display or the like. Besides, a magnetic disk represented by a HD (Hard Disc), or a semiconductor memory, an optical disk or the like is applied to the storage unit 87.

The CPU 81 maneuvers, in the RAM 83, that program included in the plurality of programs stored in the ROM 82 which corresponds to the instructions given through the operation input unit 84, and controls the display unit 86 and the storage unit 87 appropriately according to the program thus maneuvered.

In addition, the CPU 81 controls the transmitting illumination section 13, the stage unit 14, the image sensing element 18 and the loading mechanism 24 through the interface unit 85 in an appropriate manner, according to the program maneuvered.

1-4. Biological Sample Photographing Treatment

Figure 11:
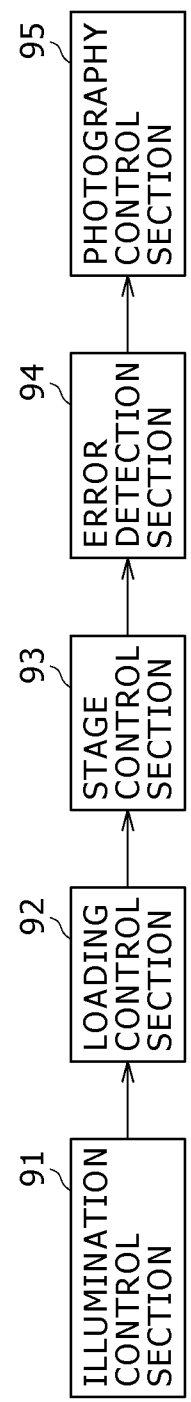
FIG. 11 is a schematic diagram showing the functional configuration of a CPU.

When an instruction to acquire an image of a biological sample is received from the operation input unit 84, the CPU 81 functions as an illumination control section 91, a loading control section 92, a stage control section 93, an error detection section 94 and a photography control section 95, as shown in FIG. 11, according to the program corresponding to the instruction.

The illumination control section 91 causes the transmitting illumination section 13 to emit illuminating light. The loading control section 92 operates the turning section 24D and the vertically movable section 24C of the loading mechanism 24 to move the supply arm 24A into a position for directly facing the supply tray 22A.

Next, the loading control section 92 drives the driving section 32 for the supply arm 24A to move the arm translation section 33 to the lower side of a slide glass SG set in the supply tray 22A. Then, the loading control section 92 moves the supply arm 24A in the Z-axis positive direction so that the slide glass SG is located between the slide glass holding section 33a and the arm clamp 34.

Thereafter, the loading control section 92 drives the clamp motor 35 so as to grip the slide glass SG by clamping it between the slide glass holding section 33a and the arm clamp 34. Then, the loading control section 92 drives the driving section 32 to return the arm translation section 33 into its original position, and, thereafter, operates the turning section 24D and the vertically movable section 24C to move the supply arm 24A into a position for directly facing the stage 41.

Then, the loading control section 92 drives the driving section 32 for the supply arm 24A to move the arm translation section 33 to the upper side of the slide glass hole 41c of the stage 41. Thereafter, the loading control section 92 drives the clamp motor 35 to release the slide glass SG having been clamped between the slide glass holding section 33a and the arm clamp 34.

Then, the loading control section 92 moves the supply arm 24A in the Z-axis negative direction, to mount the slide glass SG at the slide glass mounting position. Thereafter, the loading control section 92 drives the driving section 32 to return the arm translation section 33 into its original position.

The stage control section 93 set the L-shaped clips 50, 51 and the U-shaped clip 52 in the open state when the slide glass SG is mounted onto the stage 41 by the supply arm 24A.

After the slide glass SG is mounted on the stage 41, the stage control section 93 drives the motor 46 to move the cam plate 45 to a position located most on the X-axis negative direction side within its movable range so that transition from the open state to the closed state occurs.

Specifically, the stage control section 93 moves the tips 50c and 51c of the L-shaped clips 50 and 51 in the Y-axis negative direction and moves the tip 52d of the U-shaped clip 52 in the X-axis negative direction, through the gear group 47 and the cam plate 45.

By this, the stage control section 93 fixes the slide glass SG on the stage 41 by the projections 42, 43, 44, the L-shaped clips 50, 51 and the U-shaped clip 52.

During when the stage control section 93 moves the L-shaped clips 50, 51 and the U-shaped clip 52, the error detection section 94 measures the outputs of the photointerrupters 74, 75 and 76, thereby detecting whether or not the L-shaped clips 50, 51 and the U-shaped clip 52 have been moved into the positions corresponding to the closed state.

When the photointerrupters 74, 75 and 76 output the detection signals, the error detection section 94 decides that the slide glass SG has failed to be fixed, in other words, an error has been generated.

Figure 12A:
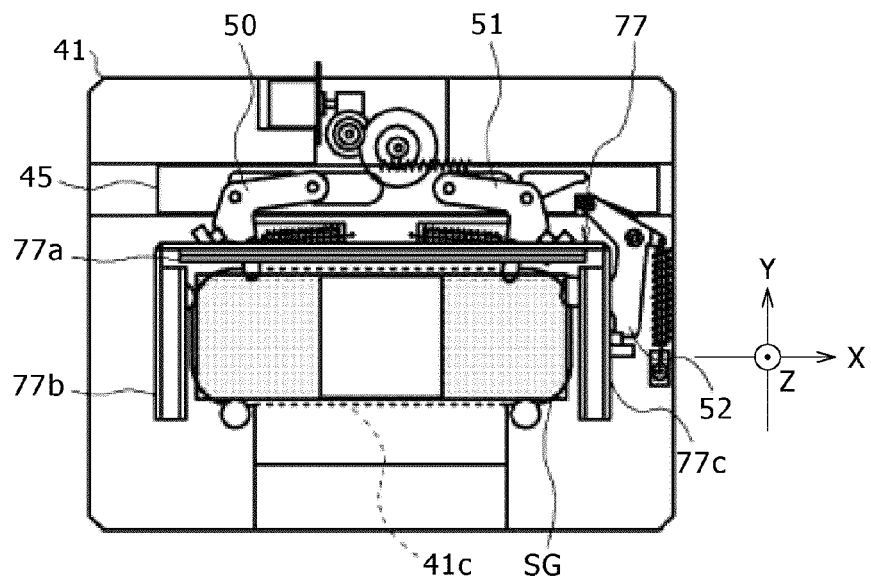
FIGS. 12A and 12B are schematic diagrams showing manner (1) in which the slide glass is discharged upon detection of an error.

Examples of the case where an error is generated include a situation in which, as shown in FIG. 12A, the L-shaped clips 50 and 51 lift up the slide glass SG and the L-shaped clips 50 and 51 come under the slide glass SG. Incidentally, since the L-shaped clips 50 and 51 are thicker than the slide glass SG, the possibility of the slide glass SG being lifted by the L-shaped clips 50 and 51 is greatly lowered. However, an error may be considered to be generated in the cases where, for example, the slide glass SG is broken or has a size other than the prescribed.

Figure 13A:
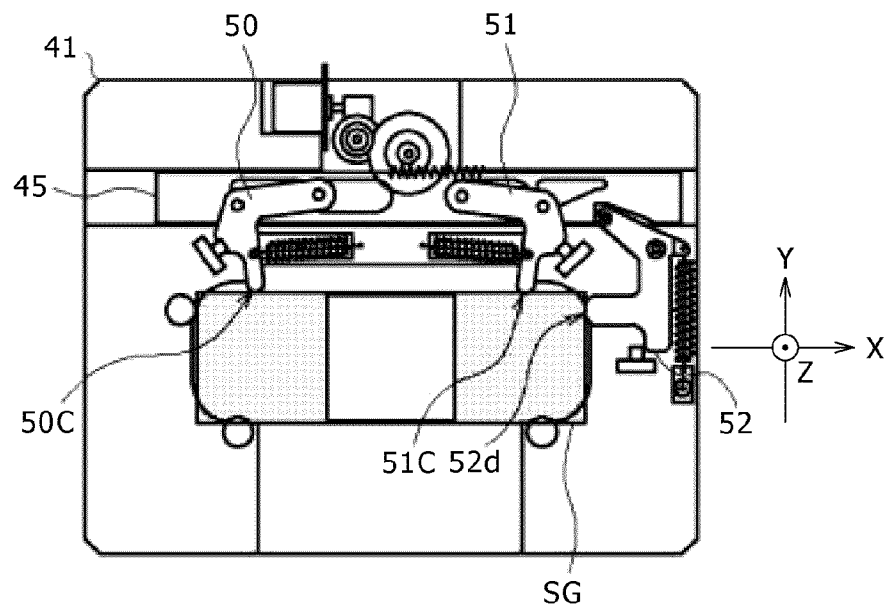
FIGS. 13A and 13B are schematic diagrams showing manner (2) in which the slide glass is discharged upon detection of an error.

Another example of the case where an error is generated is a situation in which, as shown in FIG. 13A, the slide glass SG being pressed by the L-shaped clips 50 and 51 is caused to ride onto the projections 43 and 44. Incidentally, since the projections 43 and 44 are set to be taller than the thickness of the slide glass SG, the possibility of the slide glass SG riding onto the projections 43 and 44 is reduced greatly. However, an error may be considered to be generated, in the same manner as above-mentioned.

In view of this, when an error is detected by the error detection section 94, the stage control section 93 moves the cam plate 45 so as to cause transition from the closed state to the open state, thereby moving the L-shaped clips 50 and 51 in the Y-axis positive direction.

Figure 12B:
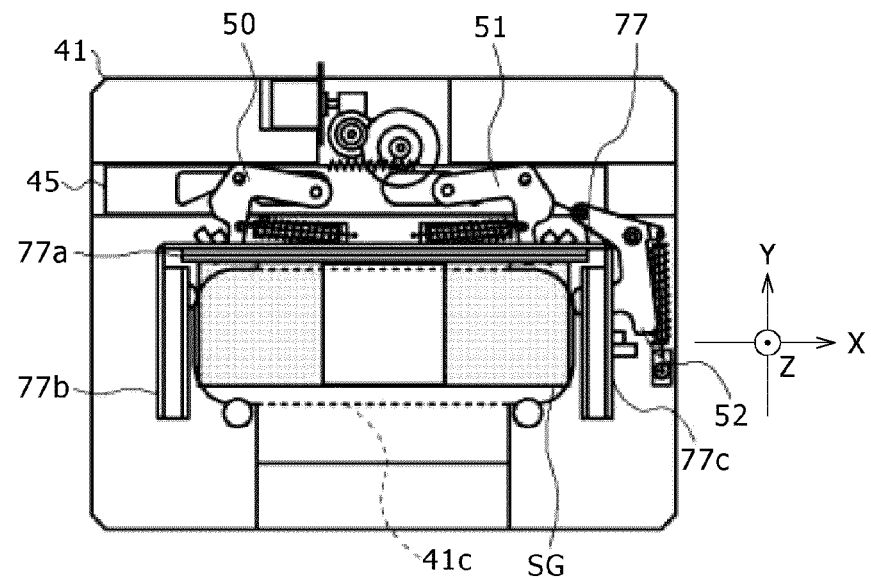

With the L-shaped clips 50 and 51 thus moved to the positions corresponding to the open state, it is ensured that, even if the slide glass SG is drawn attendantly on the movement of the L-shaped clips 50 and 51, the slide glass SG comes into abutment on the central plate 77a of the movement preventive guide 77, as shown in FIG. 12B, so that the slide glass SG is prevented from being drawn further and can be returned onto the stage 41.

Thus, it is possible to solve an error in which the L-shaped clips 50 and 51 would lift up the slide glass SG and the L-shaped clips 50 and 51 would come under the slide glass SG. Incidentally, a situation may be considered in which the U-shaped clip 52 would come under the slide glass SG, but the U-shaped clip 52 can be returned onto the stage 41 in the same manner as above-mentioned.

In addition, after the L-shaped clips 50, 51 and the U-shaped clip 52 are put into the open state, the loading control section 92 operates the turning section 24D and the vertically movable section 24C of the loading mechanism 24 to move the discharge arm 24B into a position for directly facing the stage 41. Then, the loading control section 92 drives the driving section 32 for the discharge arm 24B to move the arm translation section 33 to the lower side of the slide glass SG on the stage 41.

Figure 13B:
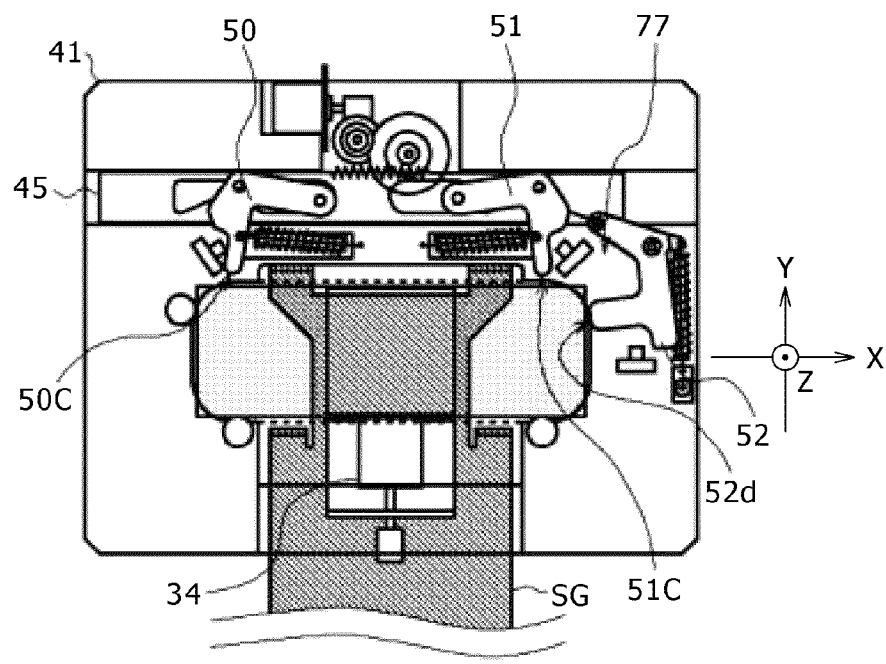

Then, as shown in FIG. 13B, the loading control section 92 drives the clamp motor 35 so as to push the slide glass SG in the Y-axis positive direction by the arm clamp 34, thereby returning the slide glass SG onto the stage 41. In this manner, it is possible to solve an error in which the slide glass SG being pushed by the L-shaped clips 50 and 51 would ride onto the projections 43 and 44.

After pushing the slide glass SG in the Y-axis positive direction by the arm clamp 34, the loading control section 92 causes the slide glass holding section 33a and the arm clamp 34 to grip the slide glass SG as it is.

Then, the loading control section 92 controls the loading mechanism 24 so that the slide glass SG in this gripped state is discharged into the discharge tray 22B.

Incidentally, a situation may be considered in which the slide glass SG would ride onto the projection 42. In such a case, however, the error can be solved by gripping the slide glass SG with the slide glass holding section 33a and the arm clamp 34.

On the other hand, in the case where no error is detected by the error detection section 94, the photography control section 95 photographs a magnified image of a biological sample disposed on the slide glass SG through the image sensing element 18, and stores the photographic data into the storage unit 87.

The loading control section 92 and the stage control section 93 discharge into the discharge tray 22B the slide glass SG having been subjected to photography, by controlling the stage 41 and the loading mechanism 24, as required.

1-5. Procedure of Biological Sample Photographing Treatment

Figure 14:
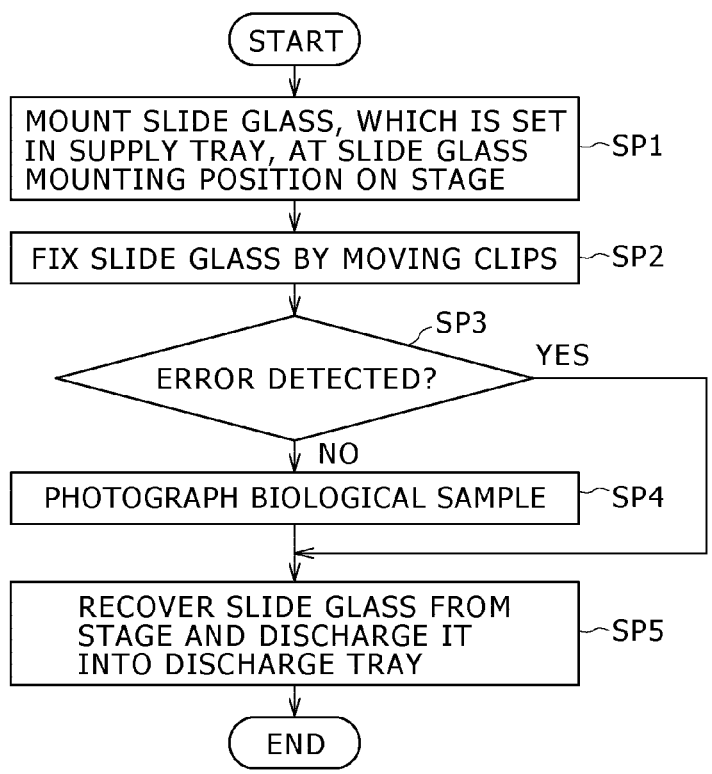
FIG. 14 is a flow chart showing the procedure of a biological sample photographing treatment.

Now, the procedure of the above-mentioned biological sample photographing treatment will be described using the flow chart shown in FIG. 14.

The CPU 81, starting a control from the START step, proceeds to step SP1, in which it controls the loading mechanism 24 appropriately so as to mount the slide glass SG, set in the supply tray 22A, at the slide glass mounting position on the stage 41. Then, the control proceeds to step SP2.

In step SP2, the CPU 81 moves the L-shaped clips 50, 51 and the U-shaped clip 52 from the open state so as to fix the slide glass SG at the fixing position by the projections 42, 43, 44, the L-shaped clips 50, 51 and the U-shaped clip 52, and then proceeds to the next step SP3.

In step SP3, the CPU 81 decides whether or not the L-shaped clips 50, 51 and the U-shaped clip 52 have come into the closed state, based on whether or not detection signals are outputted from the photointerrupters 74, 75 and 76.

Here, when it is decided that the L-shaped clips 50, 51 and the U-shaped clip 52 have come into the closed state, it means that the slide glass SG has not been fixed in the fixing position. In this instance, the CPU 81 goes to step SP5, in which it discharges the slide glass SG into the discharge tray 22B.

On the other hand, when it is decided that the L-shaped clips 50, 51 and the U-shaped clip 52 have not come into the closed state, it means that the slide glass SG has been fixed in the fixing position. In this instance, the CPU 81 proceeds to step SP4, in which it photographs the biological sample through the image sensing element 18, and then goes to the next step SP5.

In step SP5, the CPU 81 discharges the slide glass SG into the discharge tray 22B, and finishes the processing.

1-6. Operation and Effects

In the configuration as above, the stage system 15 has the projections 42, 43 and 44 which are projected, more than the thickness of the slide glass SG, from the upper surface 41a of the stage 41 provided for mounting the slide glass SG thereon.

In addition, the stage system 15 has L-shaped clips 50, 51 and the U-shaped clip 52 which are thicker than the slide glass SG and which press the slide glass SG, disposed between themselves and the projections 42, 43 and 44, against the projections 42, 43 and 44 with forces of such a degree that the cover glass CG is not broken.

This ensures that in the stage system 15, the slide glass SG can be clamped by the projections 42, 43, 44, the L-shaped clips 50, 51 and the U-shaped clip 52 and be fixed at the fixing position.

Figure 15:
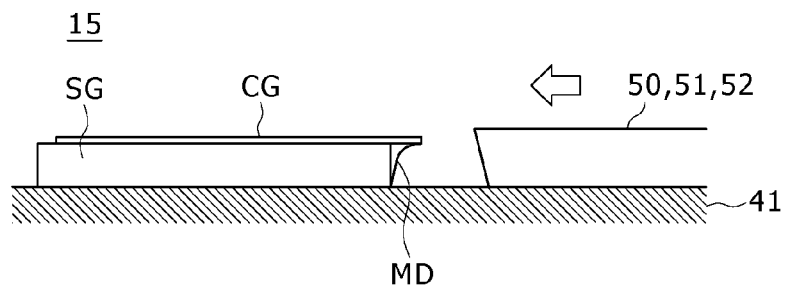
FIG. 15 is a schematic diagram showing fixation of a slide glass by a stage system according to an embodiment.

In this stage system 15, even in the case where a slide glass SG with the cover glass CG and the sealing medium MD protruding therefrom is to be fixed, as shown in FIG. 15, the possibility of the slide glass SG being lifted up by the L-shaped clips 50, 51 and the U-shaped clip 52 can be greatly lowered, since the clips are thicker than the slide glass SG.

Meanwhile, since the L-shaped clips 50, 51 and the U-shaped clip 52 are thicker than the slide glass SG, the L-shaped clips 50, 51 and the U-shaped clip 52 press the cover glass CG in the case where the cover glass CG is protruding from the slide glass SG.

Even in such a case, the slide glass SG can be fixed without breaking the cover glass CG, since it is ensured in the stage system 15 that the L-shaped clips 50, 51 and the U-shaped clip 52 each press with a force of such a degree that the cover glass CG is not broken.

In this instance, in the stage system 15, the L-shaped clips 50, 51 and the U-shaped clip 52 press with respective forces of such a degree that the cover glass CG is not broken, and, accordingly, the respective forces are weak. Since the slide glass SG is fixed by pressing it with the plurality of clips, however, the slide glass SG can be fixed in an assured manner.

In addition, the stage system 15 has the movement preventive guide 77 provided on the upper side of the stage 41 so as to surround the position (area) where the slide glass SG is mounted on the stage 41.

The movement preventive guide 77 is arranged to be spaced in the Z-axis positive direction from the upper surface 41a of the stage 41 by a distance which is longer than the thickness of the slide glass SG and which is shorter than the sum of the thickness of the slide glass SG and the thickness of the L-shaped clips 50, 51 and the U-shaped clip 52.

This ensures in the stage system 15 that, even when the slide glass SG has ridden onto the L-shaped clips 50, 51 and the U-shaped clip 52, the slide glass SG can be prevented from being moved attendantly on the movement of the L-shaped clips 50, 51 and the U-shaped clip 52.

Besides, the stage system 15 is so configured that, with only the cam plate 45 reciprocated, the slide glass SG is pressed from two different directions by the L-shaped clips 50, 51 and the U-shaped clips 52 which are linked to the cam plate 45. This ensures in the stage system 15 that the L-shaped clips 50, 51 and the U-shaped clip 52 can be moved by only the motor 46 for driving the cam plate 45, so that the number of component parts of the stage system 15 can be reduced and, in addition, reductions in size and weight can be realized. This is particularly useful in a stage of a microscope which has to be moved at high speed at the time of obtaining a magnified image of a biological sample.

According to the configuration as above, the projections 42, 43 and 44 taller than the thickness of the slide glass SG are projected from the stage 41, and the L-shaped clips 50, 51 and the U-shaped clip 52 thicker than the slide glass SG are provided which press the slide glass SG disposed between themselves and the projections 42, 43 and 44.

This ensures that even when the sealing medium MD and the cover glass CG are protruding from the area of the slide glass SG, the probability of fixation of the slide glass SG can be greatly improved, so that accuracy in fixation of the slide glass SG can be enhanced.

2. Another Embodiment

In the above embodiment, the case where the projections 42, 43 and 44 are provided as the projection block has been described. The present application is not limited to this configuration; for example, L-shaped members or the like may also be provided as the projection block. It is to be noted here, however, that the projection block which are roughly cylindrical in shape permit the slide glass SG to be fixed through point contact, whereby the probability with which the slide glass SG can be fixed as desired can be enhanced, as compared with the case of surface contact.

Besides, in the above embodiment, the case where the L-shaped clips 50, 51 and the U-shaped clip 52 are provided as the pressing block has been described. This is not limitative of the present application; for example, pressing block of other shape may also be used, insofar as the slide glass SG is pressed by members thicker than the slide glass SG.

In addition, in the above embodiment, description has been made of the case where the slide glass SG, the sealing medium MD or the cover glass CG is pressed by the L-shaped clips 50, 51 and the U-shaped clip 52 with forces of such a degree that the cover glass CG is not broken, under the actions of the biasing forces of the springs 71, 72 and 73. The present application is not limited to this configuration. The L-shaped clips 50, 51 and the U-shaped clip 52 may also be pressed by other forces which generate forces of such a degree that the cover glass CG is not broken.

In the above embodiment, description has been made of the case where the CPU 81 performs the above-mentioned biological sample photographing treatment according to the program stored in the ROM 82. This is not limitative of the present application. For example, the above-mentioned biological sample photographing treatment may also be conducted according to a program which is installed from a storage medium, downloaded from Internet or any other various roots.

In the above embodiment, description has been made of the case where the stage 41 is provided as the stage, the projections 42, 43 and 44 are provided as the pressing block, and the L-shaped clips 50, 51 and the U-shaped clip 52 are provided as the pressing block. In this application, however, a stage, a projection block and a pressing block having any of other various configurations may also be provided.

The present application can be used in bioindustries such as bioexperiments, development of new drugs, observation of developments of a patient's condition, etc.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A stage system, comprising:
   a stage on which to mount a slide glass;
   a projection block projected more than a thickness of the slide glass from a surface of the stage on which to dispose the slide glass;
   a plurality of pressing blocks provided on that surface of the stage on which to dispose the slide glass, being thicker than the slide glass, and pressing toward the projection block the slide glass; and
   a reciprocation block coupled to the pressing blocks and configured to reciprocate in one predetermined direction, the pressing blocks pressing the slide glass from two different directions substantially simultaneously according to reciprocation of the reciprocation block.

2. The stage system according to claim 1,
   wherein the pressing blocks are each biased by a spring.

3. The stage system according to claim 2, further comprising:
   a driving block configured to drive the reciprocation block.

4. The stage system according to claim 1, further comprising
   a movement preventive guide which surrounds a position for fixation of the slide glass, and is disposed to be spaced upward from the stage by a distance that is longer than the thickness of the slide glass and shorter than the sum of the thickness of the slide glass and the thickness of a pressing block.

5. A microscope, comprising:
   a stage on which to mount a slide glass;
   a projection block projected more than a thickness of the slide glass from a surface of the stage on which to dispose the slide glass;
   a plurality of pressing blocks provided on that surface of the stage on which to dispose the slide glass, being thicker than the slide glass, and pressing toward the projection block the slide glass;
   a reciprocation block coupled to the pressing blocks and configured to reciprocate in one predetermined direction, the pressing blocks pressing the slide glass from two different directions substantially simultaneously according to reciprocation of the reciprocation block; and
   a lens magnifying a sample disposed on the slide glass mounted on the stage.

\* \* \* \* \*